(12) United States Patent
Sharpe et al.

(10) Patent No.: US 7,185,647 B2
(45) Date of Patent: Mar. 6, 2007

(54) DETERMINATION OF SMOOTHNESS OF CANISTERS CONTAINING INHALABLE MEDICAMENTS

(75) Inventors: Stefan A. Sharpe, Jersey City, NJ (US); Slavka Libovicova-Tarzian, Belmar, NJ (US); Joel A. Sequeira, Edison, NJ (US)

(73) Assignee: Schering Corporation, Kenilworth, NJ (US)

( * ) Notice: Subject to any disclaimer, the term of this patent is extended or adjusted under 35 U.S.C. 154(b) by 166 days.

(21) Appl. No.: 10/633,449

(22) Filed: Jul. 31, 2003

(65) Prior Publication Data

US 2004/0061870 A1   Apr. 1, 2004

Related U.S. Application Data

(60) Provisional application No. 60/403,941, filed on Aug. 16, 2002.

(51) Int. Cl.
*A61M 11/00* (2006.01)
*A61K 38/05* (2006.01)
*G01B 11/30* (2006.01)

(52) U.S. Cl. .................. 128/200.21; 128/200.22; 514/18; 514/209; 356/600; 382/154

(58) Field of Classification Search ........ 356/600–601; 382/150–154; 514/18, 2, 209; 128/200.21, 128/200.14, 200.22, 203.12, 203.14
See application file for complete search history.

(56) References Cited

U.S. PATENT DOCUMENTS

| 6,132,835 A * | 10/2000 | Scholz et al. | 428/68 |
| 6,223,746 B1 * | 5/2001 | Jewett et al. | 128/203.12 |
| 6,644,305 B2 * | 11/2003 | MacRae et al. | 128/200.21 |
| 6,691,058 B2 * | 2/2004 | Blakley | 702/130 |
| 6,815,426 B2 * | 11/2004 | Scialdone et al. | 514/18 |
| 2003/0005927 A1 * | 1/2003 | Van Oort et al. | 128/200.23 |

FOREIGN PATENT DOCUMENTS

WO   WO 93/12615   * 6/1993

* cited by examiner

*Primary Examiner*—Layla G. Lauchman
*Assistant Examiner*—Sang Hoang Nguyen
(74) *Attorney, Agent, or Firm*—Schering-Plough Patent Department (57) ABSTRACT

Disclosed are methods for determining the smoothness index of the interior of a metered dose container.

16 Claims, 6 Drawing Sheets

DETERMINATION OF SMOOTHNESS OF CANISTERS CONTAINING INHALABLE MEDICAMENTS

CROSS REFERENCE TO RELATED APPLICATION

This application claims benefit of priority to U.S. Provisional Patent Application 60/403,941, filed Aug. 16, 2002.

BACKGROUND OF THE INVENTION

The present invention pertains to aerosol formulations of drugs, such as those formulations suitable for use in pressurized aerosol metered dose inhalers.

Aerosolized drugs have been used for many years to treat disorders of the respiratory system, and as a convenient means for the systemic introduction of various pharmaceutical agents into the body. The typical aerosol formulation in a metered dose inhaler for treating disorders such as asthma or rhinitis is a suspension of one or more drug substances in a fully halogenated (with chlorine and/or fluorine) lower alkyl compound propellant, further containing small amounts of surfactants and/or excipients which are usually soluble in the propellant. Pharmaceutical agents administered by means of metered dose inhalers are usually bronchodilators or corticosteroids.

Typical formulations contain chlorofluorocarbon propellants, the drug substance and ethanol, which is miscible with the propellant, and sometimes also contain a surfactant such as oleic acid for maintaining a stable suspension, lubrication of the metering valve and other functions.

In general, drug particle sizes from about 1 to about 5 μm are preferred for administration to the lower airway, with particles smaller than about 0.5 μm frequently being exhaled without complete deposition on tissues, while particles larger than about 10 μm can exhibit considerable deposition in the mouth and/or pharynx and therefore not reach the lower airway. Very large particles cannot pass through a metering valve and will not be reliably dispensed.

With the implication of fully halogenated chlorofluorocarbon propellants in the environmentally harmful destruction of ozone in the upper atmosphere, the availability of these propellants has become quite restricted. This has encouraged development work toward formulations containing propellants having reduced upper atmospheric reactivity, such work particularly centering about the propellants HFC 134a and HFC 227, these compounds having approximately the same physical properties as those of the older chlorofluorocarbons used for medicinal aerosols.

Metered dose inhalers typically employ metallic canisters to store the medicament, propellant and excipients. The inner wall of the canister can, for example, be embedded with various plastic coatings, e.g. Teflon. This aids in preventing deposition of the medicament on to the wall.

It is preferable that the inside of the container or can that is in contact with the medicament be as smooth possible. This is so because irregularities in the surface of the container can provide a seed area for the medicament to first lodge or deposit and eventually grow. The process of mass transfer and consequent deposition of the medicament crystals is usually dependent on the crystal size of the medicament, the presence of impurities, and the temperature of the ambient and surface irregularities.

These surface irregularities may provide a locus for the deposition of larger crystals which have higher settling velocities. These would create a "mass transfer" boundary layer where mass transfer proceeds by molecular diffusion. Fluctuations in the ambient temperature, as encountered during shipping and handling, can lead to crystal growth, the activation energy for which is temperature dependent and follows the Arrhenius equation. These "growing" crystals would also remain lodged/deposited on the surface imperfection and thus become unavailable for delivery. Therefore overtime, this phenomenon of can wall deposition can lead to a decrease in the amount of medicament that is dispensed to the patient.

There thus exists a need for dosing systems having canisters with smooth interiors that minimize the possibility of can wall deposition by not providing the locii for crystal deposition such that it is ensured that the patient receives the requisite amount of medication.

SUMMARY OF THE INVENTION

Accordingly, there is disclosed a method for determining a smoothness index of a metered dose container having an inner core comprising the steps of subjecting said inner core of said metered dose container to reflected light photomicrography to obtain a digital image containing a plurality of pixels of said inner core, determining from said digital image the brightness of each of said pixels and quantifying said brightness by assigning an integer value thereto, wherein said value corresponds to an amount of brightness and comparing said brightness of said pixel to a reference standard to determine the smoothness index of said inner core of said metered dose container.

There is also disclosed a method for determining a smoothness index of a metered dose container having an inner core comprising the steps of subjecting said inner core of said metered dose container containing at least one pharmacologically active agent to reflected light photomicrography to obtain a digital image containing a plurality of pixels of said inner core, determining from said digital image the brightness of each of said pixels and quantifying said brightness by assigning an integer value thereto, wherein said value corresponds to an amount of brightness and comparing said brightness of said pixel to a reference standard to determine the smoothness index of said inner core of said metered dose container.

BRIEF DESCRIPTION OF THE DRAWING

FIG. 1 illustrates the manner in which a digital micrograph (i.e., a digital image containing a plurality of pixel of the inner core) is obtained from a sample of an inner core (from a metered dose container) based on reflected light photomicrography wherein a smoothness index is calculated.

BRIEF DESCRIPTION OF THE DIGITAL MICROGRAPHS

FIG. 2 is of an epoxy coated can with imperfections.

FIG. 3 is of an FEP coated can.

FIG. 4 is of a PFA coated can with non-optimized coating.

FIG. 5 is of a PFA coated can with optimized coating.

FIG. 6 is of an Epoxy coated can with drug.

DETAILED DESCRIPTION OF THE INVENTION

Accordingly, there is disclosed the use of reflected light photomicrography and digital image analysis as a quantitative and qualitative measure of the surface smoothness of coated and uncoated cans used for the packaging of pressurized aerosols.

A qualitative and quantitative physical description of surface's smoothness is defined in this invention as a Smoothness Index. The present invention is based upon the use of reflected light in a microscope to obtain a digital image and process this image utilizing image processing. Image processing manipulates information within an image to make it more useful; digital image processing is a specific type of image processing performed with a computer.

The image is thereafter digitized whereby the image is divided into a horizontal grid, or array, of very small regions called pixels (picture elements). In the computer the image is represented by this digital grid, or bitmap. Each pixel in the bitmap is identified by its position in the grid, as referenced by its row (x) number and column (y) number. When a source image, such as a photograph, is digitized, it is examined in grid fashion. That is, each pixel in the image is individually sampled, and it brightness is measured and quantified.

This measurement results in a value for the pixel, usually an integer, which represents the brightness or darkness of the image at that point. This value is stored in the corresponding pixel of the computer's image bit map. It is these areas of brightness and darkness that were used for the qualitative and quantitative evaluation of the amount of light reflected off the studied surfaces, and hence their smoothness. The brighter the area in the image, the more light is reflected, and therefore, the smoother it is; the darker the area in the image is, the less light is reflected, and therefore, the less smooth it is. The integers, obtained for the studied surfaces, representing the amount of reflected light are compared to the integer obtained from aluminum foil, used as a standard reference material for reflection of light.

Figure 1:
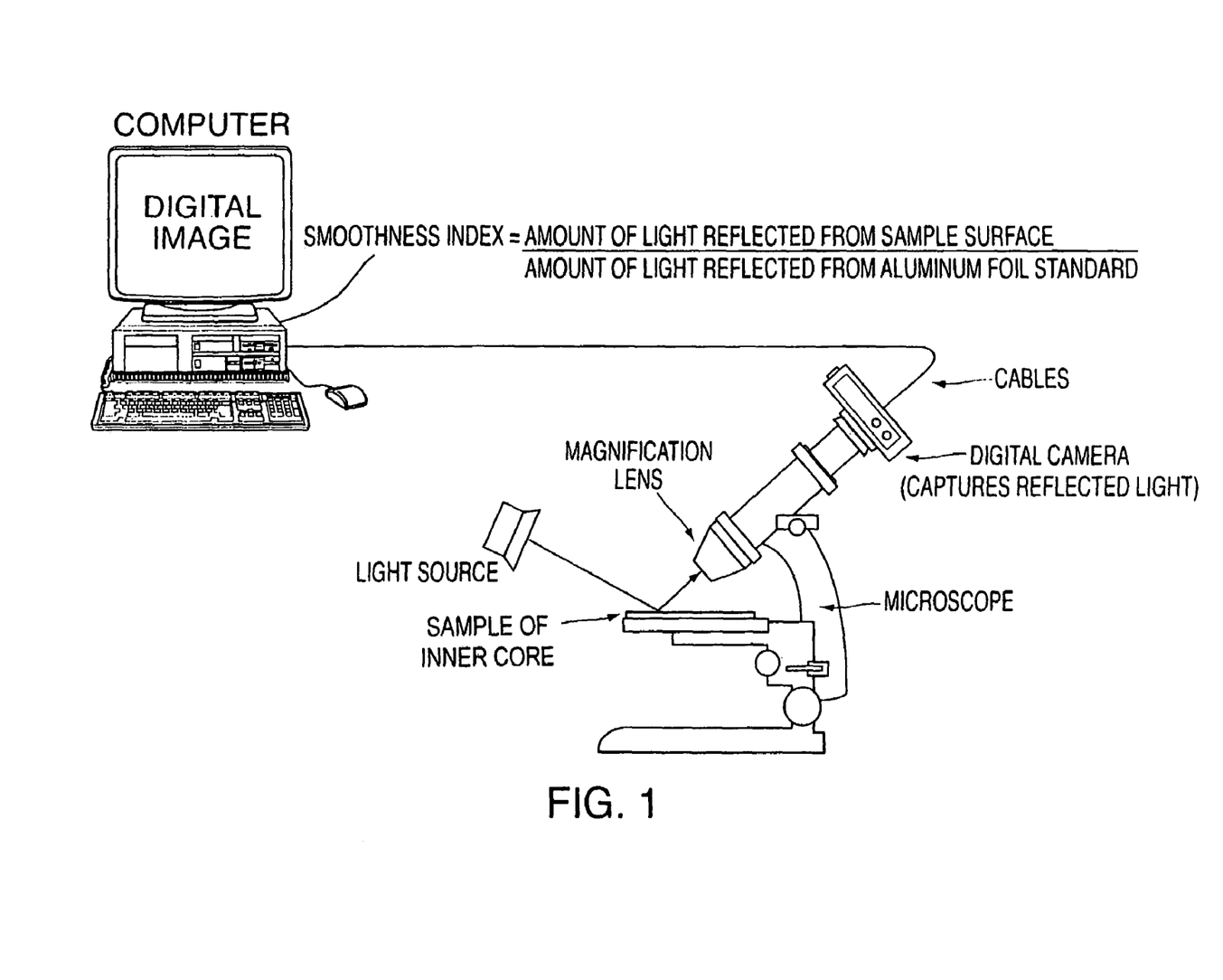
Figure 2:
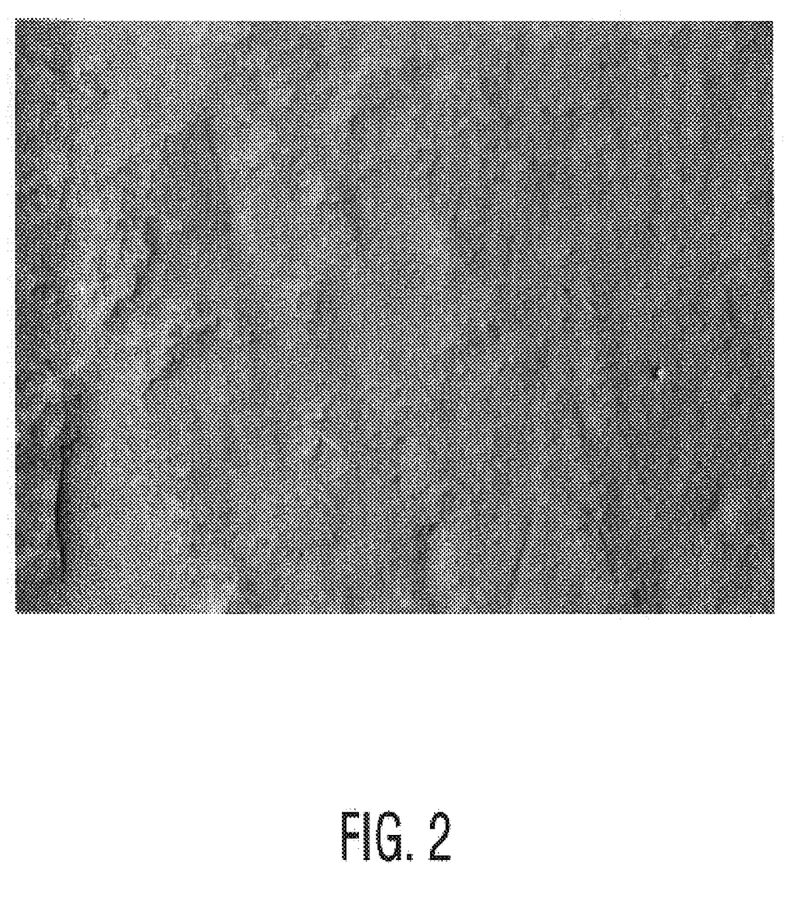
Figure 3:
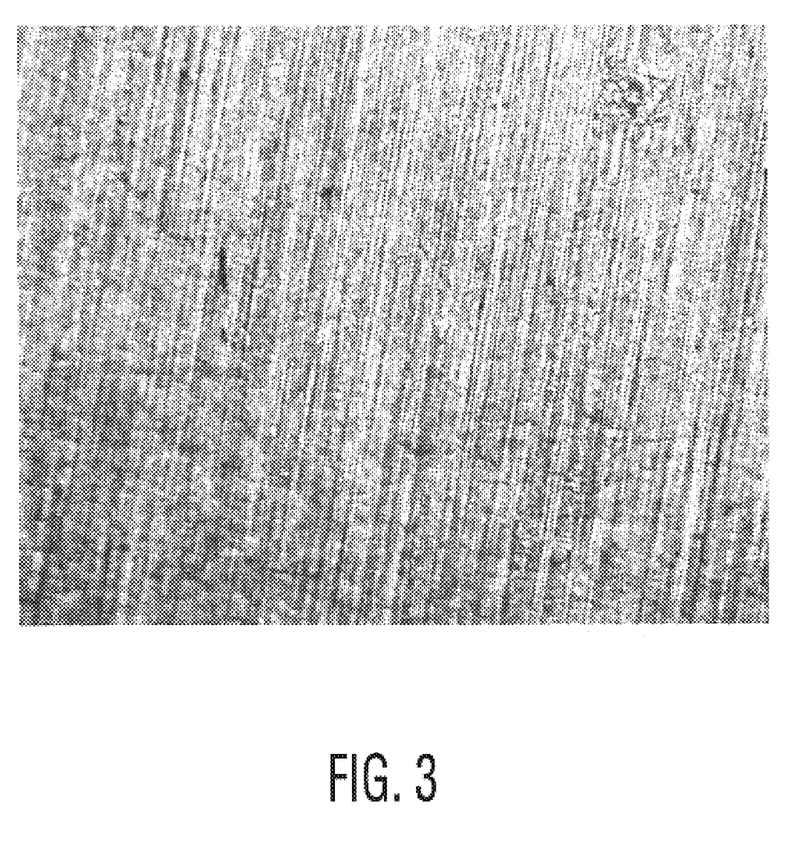
Figure 4:
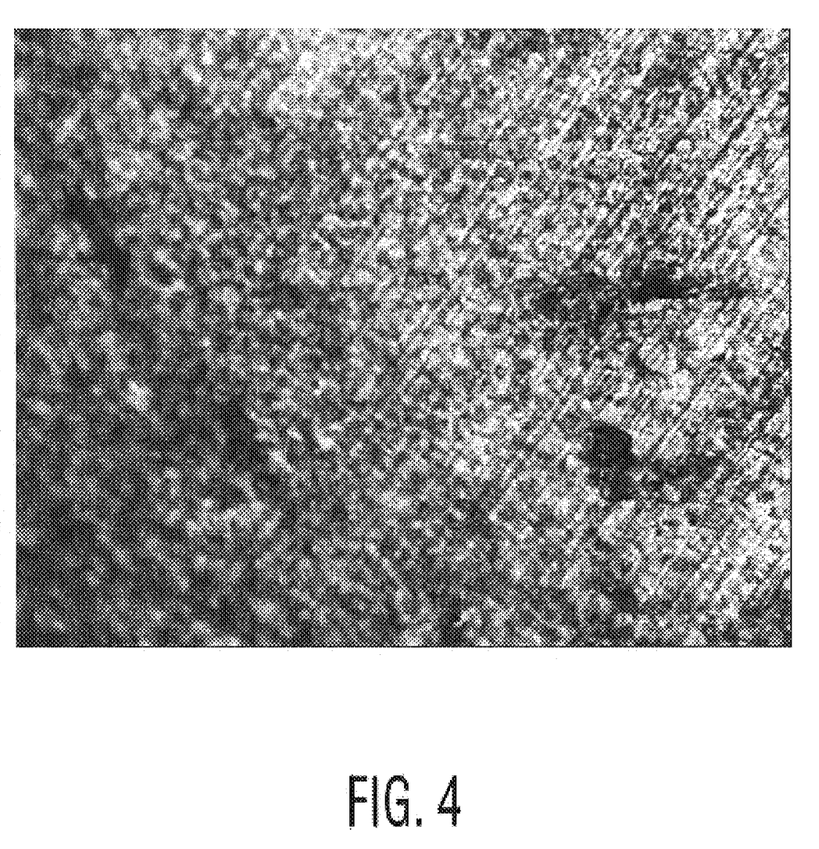
Figure 5:
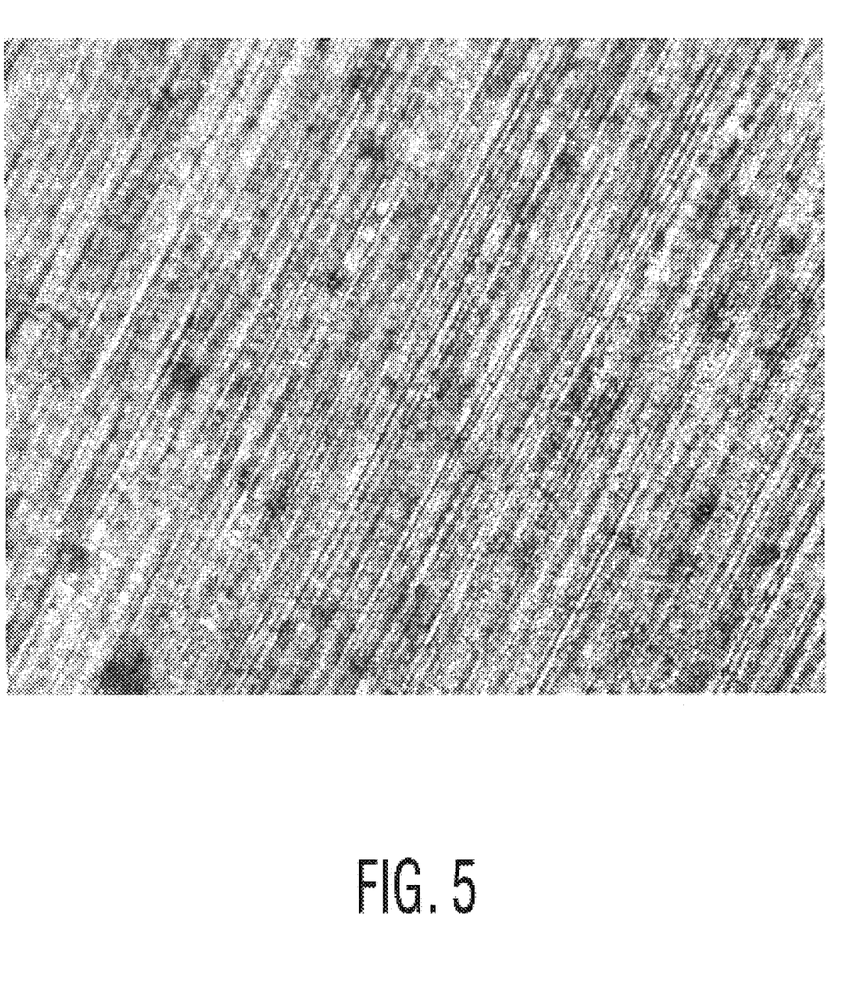
Figure 6:
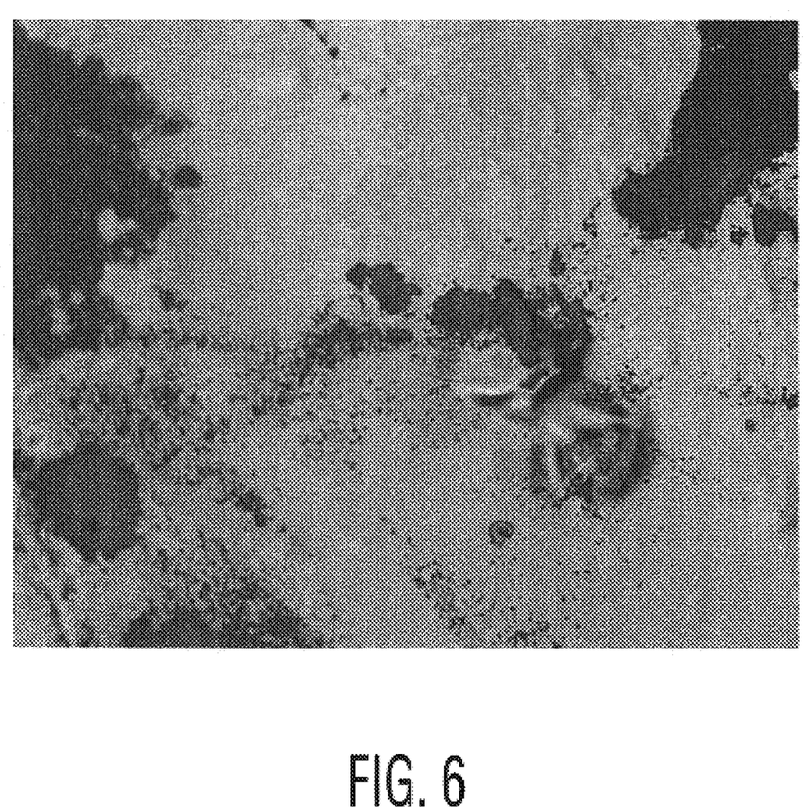

The ratio of the integer for the studied surface to the integer obtained for the aluminum foil was called the "Smoothness Index," the closer the ratio to one the brighter, and hence, the smoother the surface is. The smoothness index is defined as follows:

Smoothness Index=Amount of Reflected Light from the Studied Surface÷Amount of Light Reflected from Aluminum Foil Standard Advantages of the present invention included the ability to distinguish between cans used for MDI products, with various surface smoothness, i.e., possible imperfection in the surface of cans coated with the same material, e.g., epoxy coated cans. See FIG. 2. Another feature of the invention is to distinguish between cans coated with various materials, e.g., epoxy coated versus teflon coated. See FIGS. 2 and 3. Another advantage of the invention is to distinguish between cans coated with the same material such as teflon, but cured at different conditions. See FIGS. 4 and 5. Another advantage of the invention is to detect drug deposition on the surface of these cans. See FIG. 6.

The canisters of the present invention can have an inner core that is preferably embedded with various forms of Teflon. As used herein, Teflon PTFE is defined as polytetrafluoroethylene; Teflon FEP is defined as fluorinated ethylene copolymer; Teflon PFA is defined as perfluoroalkoxy ethylene propylene copolymer; and Teflon ETFE is defined as a copolymer of ethylene and tetrafluoroethylene. The inner core may also be embedded or treated with other coatings and/or materials such as lacquer, epoxy resin and other materials as known to one of the art.

Preferably, the method in accordance with the present invention analyzes dosing systems that employ a canister containing at least one pharmacologically active agent or drug that is a material capable of being administered to the respiratory system, including the lungs. For example, a drug in accordance with the present invention could be administered so that it is absorbed into the blood stream through the lungs. Particularly preferred pharmacologically active agents in accordance with the present invention include, without limitation, corticosteroids such as: mometasone furoate anhydrous; beclomethasone dipropionate; budesonide; fluticasone; dexamethasone; flunisolide; triamcinolone; (22R)-6α,9α-difluoro-11β,21-dihydroxy-16α,17α-propylmethylenedioxy-4-pregnen-3,20-dione; tipredane and the like. Mometasone furoate anhydrous is the most preferred and is available from Schering-Plough Corporation.

β-agonists (including $β_1$ and $β_2$-agonists) including, without limitation, albuterol, terbutaline, salmeterol, and bitolterol may also be administered with the present invention. Formoterol (also known as eFormoterol) e.g., as the fumarate or tartrate, a highly selective long-lasting $β_2$-adrenergic agonist having bronchospasmolytic effect, is effective in the treatment of reversible obstructive lung ailments of various genesis, particularly asthmatic conditions and may also be administered with the present invention. Another long-acting β-agonist which can be administered in accordance with the present invention is known as TA-2005, chemically identified as 2(1H)-Quinolinone, 8-hydroxy-5-[1-hydroxy-2-[[2-(4-(methoxyphenyl)-1-methylethyl]amino]ethyl]-monohydrochloride, [R—(R*,R*)]-.

Anticholinergics such as ipratropium bromide and oxitropium bromide may be used in the present invention. So, too can sodium cromoglycate, nedocromil sodium and leukotriene antagonists such as montelukast, zafirlukast and pranlukast. Bambuterol (e.g. as hydrochloride), fenoterol (e.g. hydrobromide), clenbuterol (e.g. as hydrochloride), procaterol (e.g. as hydrochloride), and broxaterol are highly selective $β_2$-adrenergic agonists can be administered.

Several of these compounds could be administered in the form of pharmacologically acceptable esters, salts, solvates, such as hydrates, or solvates of such esters or salts, if any. The term is also meant to cover both racemic mixtures as well as one or more optical isomers.

The canister containing a drug in accordance with the present invention can also be an inhalable protein or a peptide such as insulin, interferons, calcitonins, parathyroid hormones, granulocyte colony-stimulating factor and the like. "At least one pharmacologically active agent" as used herein may refer to a single pharmacologically active entity, or to combinations of any two or more, an example of a useful combination being a dosage form including both a corticosteroid and a β-agonist.

Also within the scope of the present invention are the analysis of canisters containing combinations of any of the above pharmaceutical products, e.g. a corticosteroid may be combined with a β-agonist in a single formulation. One such preferred combination is that of mometasone furoate anhydrous with formoterol fumarate.

The amount of drug administered will vary with a number of factors including, without limitation, the age, sex, weight, condition of the patient, the drug, the course of treatment, the number of doses per day and the like. For example, for mometasone furoate anhydrous, the amount of drug delivered per dose, i.e. per inhalation, will generally range from about 10 μg to about 10,000 μg. Doses of 25 μg, 50 μg, 75 μg, 100 μg, 125 μg, 150 μg, 175 μg, 200 μg, 250 μg, 300 μg, 400 μg and/or 500 μg are preferred.

To be topically effective in the lungs or the upper and/or lower airway passages, it is important that the pharmacologically active agent be delivered as particles of about 10 μm or less. The ability of a dosage form to actually administer free particles of these therapeutically effectively sized particles is the fine particle fraction. Fine particle fraction is, therefore, a measure of the percentage of bound drug particles released as free particles of drug having a particle size below some threshold during administration. Fine particle fraction can be measured using a multi-stage liquid impinger manufactured by Copley Instruments (Nottingham) LTD using the manufacturer's protocols. In accordance with the present invention, an acceptable fine particle fraction is at least 10% by weight of the drug being made available as free particles having an aerodynamic particle size of 6.8 μm, or less, measured at a flow rate of 60 liters per minute.

Propellant-based pharmaceutical aerosol formulations in the art use a mixture of liquid chlorofluorocarbons as the propellant. Fluorotrichloromethane, dichlorodifluoromethane and dichlorotetrafluoroethane are the most commonly used propellants in aerosol formulations for administration by inhalation. Such chlorofluorocarbons (CFCs), however, have been implicated in the destruction of the ozone layer and their production is being phased out. Hydrofluorocarbon 134a, also known as 1,1,1,2-tetrafluoroethane or HFC 134a, and hydrofluorocarbon 227a, also known as 1,1,1,2,3,3,3-heptafluoropropane or HFC 227, are said to be less harmful to the ozone than many chlorofluorocarbon propellants, and both or mixtures thereof are considered to be used within the scope of the present invention.

The formulations of the present invention may be filled into the aerosol containers using conventional filling equipment. Since propellants 227 and 134 may not be compatible with all elastomeric compounds currently utilized in present aerosol valve assemblies, it may be necessary to substitute other materials, such as white buna rubber, or to utilize excipients and optionally surfactants which mitigate the adverse effects of propellant 227 or 134 on the valve components.

The excipient facilitates the compatibility of the medicament with the propellant and also lowers the discharge pressure to an acceptable range, i.e., about $2.76–5.52\times10^5$ newton/meter$^2$ absolute (40 to 80 psi), preferably $3.45–4.83\times10^5$ newton/meter$^2$ absolute (50 to 70 psi). The excipient chosen must be non-reactive with the medicaments, relatively non-toxic, and should have a vapor pressure below about $3.45\times10^5$ newton/meter$^2$ absolute (50 psi).

As used hereinafter the term "medium chain fatty acids" refers to chains of alkyl groups terminating in a —COOH group and having 6–12 carbon atoms, preferably 8–10 carbon atoms. The term "short chain fatty acids" refers to chains of alkyl groups terminating in a —COOH group and having 4–8 carbon atoms. The term "alcohol" includes $C_1$–$C_3$ alcohols, such as methanol, ethanol and isopropanol.

Among the preferred excipients are: propylene glycol diesters of medium chain fatty acids available under the tradename Miglyol 840 (from Huls America, Inc. Piscataway, N.J.); triglyceride esters of medium chain fatty adds available under the tradename Miglyol 812 (from Huls); perfluorodimethylcyclobutane available under the tradename Vertrel 245 (from E.I. DuPont de Nemours and Co. Inc. Wilmington, Del.); perfluorocyclobutane available under the tradename octafluorocyclobutane (from PCR Gainsville, Fla.); polyethylene glycol available under the tradename EG 400 (from BASF Parsippany, N.J.); menthol (from Pluess-Stauffer International Stanford, Conn.); propylene glycol monolaurate available under the tradename lauroglycol (from Gattefosse Elmsford, N.Y.); diethylene glycol monoethylether available under the tradename Transcutol (from Gattefosse); polyglycolized glyceride of medium chain fatty adds available under the tradename Labrafac Hydro WL 1219 (from Gattefosse); alcohols, such as ethanol, methanol and isopropanol; eucalyptus oil available (from Pluses-Stauffer International); and mixtures thereof.

A surfactant is frequently included in aerosol formulations, for purposes such as assisting with maintaining a stable suspension of the drug and lubricating the metering valve. The formulation of the present invention does not require a surfactant for maintenance of ready dispersability (such as by moderate agitation immediately prior to use), as the drug forms loose flocculates in the propellant and does not exhibit a tendency to settle or compact. Upon undisturbed storage, the drug particles remain suspended in their flocculated state. Among the preferred surfactants are: oleic acid available under the tradename oleic acid NF6321 (from Henkel Corp. Emery Group, Cincinnati, Ohio); cetylpyridinium chloride (from Arrow Chemical, Inc. Westwood, N.J.); soya lecithin available under the tradename Epikuron 200 (from Lucas Meyer Decatur, Ill.); polyoxyethylene (20) sorbitan monolaurate available under the tradename Tween 20 (from ICI Specialty Chemicals, Wilmington, Del.); polyoxyethylene (20) sorbitan monostearate available under the tradename Tween 60 (from ICI); polyoxyethylene (20) sorbitan monooleate available under the tradename Tween 80 (from ICI); polyoxyethylene (10) stearyl ether available under the tradename Brij 76 (from ICI); polyoxyethylene (2) oleyl ether available under the tradename Brij 92 (frown ICI); Polyoxyethylene-polyoxypropylene-ethylenediamine block copolymer available under the tradename Tetronic 150 R1 (from BASF); polyoxypropylene-polyoxyethylene block copolymers available under the tradenames Pluronic L-92, Pluronic L-121 end Pluronic F 68 (from BASF); castor oil ethoxylate available under the tradename Alkasurf CO-40 (from Rhone-Poulenc Mississauga Ontario, Canada); and mixtures thereof.

When mometasone is used, it is known that it has some solubility in ethanol. As with other drugs which have solubility in ethanol, there is a tendency for mometasone furoate to exhibit crystal growth in ethanol-containing formulations. Formulation parameters which do not promote drug particle size growth are known. These parameters provide the advantage of minimizing the required ethanol concentrations, to reduce the potential for unpleasant taste sensations and render the compositions more suitable for use by children and others with low alcohol tolerance.

A certain minimum level of ethanol is preferred to provide consistent and predictable delivery of the drug from a metered dose dispenser. This minimum level is about 1 weight percent of the total formulation, which results in a marginally acceptable drug delivery. Increased amounts of ethanol generally improve drug delivery characteristics. However, and to prevent drug crystal growth in the formulation, it is preferred to limit the concentration of ethanol. Experimental data indicate that the ratio of the weight of mometasone furoate to the weight of ethanol is important in preventing particle size increases.

Formulations of the invention are made according to procedures customary in the art for other aerosol compositions. Typically, all components except the propellant are mixed and introduced into aerosol containers. The containers can then be chilled to temperatures below the boiling point of the propellant, and the required amount of the chilled propellant added before the metering valve is crimped on to the container. Alternatively, the containers can be fitted with a metering valve before being filled with propellant, and the required quantity of propellant will be introduced through the valve. The available metering valve delivery volumes range from about 25 to about 100 microliters per actuation, while the amounts of drug substance required in a dose for treating a particular condition is generally about 10 to about 500 micrograms per valve actuation. These two factors combined pose limitations that dictate the points within the foregoing ethanol parameters for a given formulation. The determination of such amounts is within the skill of workers in this art.

Depending on the particular application, the container may be charged with a predetermined quantity of formulation for single or multiple dosing. Typically, the container is sized for multiple-dosing, and, therefore it is very important that the formulation delivered is substantially uniform for each dosing. For example, where the formulation is for bronchodilation, the container typically is charged with a sufficient quantity of the formulation for 200 charges.

Suitable suspensions may be screened in part by observing several physical properties of the formulation, i.e. the rate of particle agglomeration, the size of the agglomerates and the rate of particulate creaming/settling and comparing these to an acceptable standard. Such, suitable solutions may be screened/evaluated by measuring the solubility of the medicament over the entire recommended storage temperature range.

Suspensions of the present invention preferably may be prepared by either the pressure filling or cold filling procedures known in the art.

For metered dose inhalers, suspensions may be particularly preferred for efficacy and stability considerations.

Those skilled in the art may choose to add one or more preservative, buffer, antioxidant, sweetener and/or flavors or other taste masking agents depending upon the characteristics of the formulation.

The invention will be further described by means of the following examples, which are not intended to limit the invention, as defined by the appended claims, in any manner.

EXAMPLE 1

Optical microscopy was performed using an Olympus BX60 model polarized light microscope; photomicrography was performed using a digital camera (DP 10-32); Image analysis of the generated image was performed using ImagePro Plus software on a Dell OptiPlex GX1 computer with a Pentium III microprocessor; Two stage filling was performed by filling with Pamasol.

The following ingredients and packages were utilized:

a) Teflon coated 14 mL cans from CCL (PFA);

b) Teflon coated 14 mL cans from Presspart (PFA optimized curing process);

c) Teflon coated 14 mL cans from CCL (FEP same as PFA without the melanine;

d) Epoxy coated 10 mL cans from Safet;

e) 25 µL valves from Valois;

f) 63 µL valves from Valois;

g) Mometasone furoate micronized drug substance;

h) Alcohol USP 200 proof;

i) Oleic acid NF (Emersol 6321);

j) HFC-227 propellant;

k) Pamasol Macromat Line 4400 from D.H. Industries Limited; and l) Aluminum foil sheets.

The following filling procedure was applied: Drug concentrate (Mometasone furoate micronized in alcohol USP 200 proof with oleic acid NF (Emersol 6321)) was prepared in three concentrations 1.81 mg/g, 0.96 mg/g and 0.28 mg/g, and then metered into cans. The first two concentrations were metered into epoxy coated 10 mL cans while the third concentrate was metered into 14 mL teflon FEP cans and 14 mL teflon PEF cans. The cans were crimped with the 25 µL valves (the first two concentrations) and the 63 µL (the third concentration). The HFC-227 propellant was filled in to these cans up to 8 g total fill (the first two concentrations) and up to a 15 g fill (the third concentration).

The cans were then cut open to analyze the effect of the drug on the reflection from the can surfaces. The internal surface studied was the bottom flat part of the can. This approach was pursued to avoid spherical aberration interference. Spherical aberration is the most serious imperfection that occurs during reflection off a surface whereby light rays from a single point in the object are reflected from the outer zone of a spherical surface and are not focused at the same point as the central rays.

The following procedure was used to obtain the digital micrographs:

Turn on the microscope. Insert the card into the camera and close the card cover. The main switch on the camera must be in the off position. Turn on the camera. Press the light intensity "Preset" button while making sure that the Transmitted/Reflected light selector switch is in the Reflected light position. Push the Aperture Iris (AS) and the Field Iris (FS) Diaphragm knobs as well as the (SHUTTER) knob leaving the diaphragms open. Adjust the Light Path Selector knob to the middle position. Disengage the Analyzer and the Polarizer sliders from the light path by sliding the filters out.

Next, remove the Differential Interference Contrast Prism from the light path by sliding the prism out until there is a click and the engraving can be seen. Tighten the clamping screw to secure the prism. Engage the LBD (color balance and filter) built-in filter by turning its lever so that the reference mark on the lever is aligned with the reference mark on the base.

Then, disengage the ND25 (natural density filter number 25) and ND6 (natural density filter number 6) by turning their levers so that the reference marks are aligned with the reference marks on the base. Place the dummy plate on the stage and secure it with the specimen holders. Place the N 9.50 Munsell color standard (white surface up) on the stage. Turn the nosepiece to engage the 5× objective.

Select picture quality by switching the manual switch box to Super High Quality (SHQ) in the menu screen. Record mode should be activated. Move the N 9.50 Munsell color standard with the white surface up to the center and directly under the light and press the Auto Exposure Lock (AE LOCK) button to lock the exposure time and brightness of the image center.

Place the standard sample on the stage and focus the image with the coarse adjustment knob and then with the fine adjustment knob. Press the Exposure (EXPOSE) button to take a single picture. To preview the picture, press the REC/PLAY button. Press REC/PLAY button to switch back to record mode. Repeat the steps in this paragraph for the rest of the samples.

Thereafter, retrieve the picture from the database. Then, analyze the image's brightness using the ImagePro Plus software.

The smoothness index is defined as follows:

Smoothness Index=Amount of Reflected Light from the Studied Surface÷Amount of Light Reflected from Aluminum Foil Standard The following samples were analyzed:

Each sample was photographed, the image was digitized and the digital image was then analyzed using the ImagePro Plus software for the areas of brightness and darkness. The average measurement of the area of brightness is presented in pixels, i.e., for each sample the number of "bright" pixels were added. These were then divided by the number of measurements and an average was obtained. The samples that showed the higher numbers were brighter than the ones with lower numbers. For instance Teflon—Standard—FEP exhibited the highest average number of "bright area" pixels (181.9 pixels) and therefore had the smoothest surface. The Teflon-PFA non-optimized was found to be least bright and had the lowest average number of "bright area" pixels (111.7 pixels). The significance of this finding is that the technique is capable of characterizing the quality of the studied can wall surface. In addition the "Smoothness Index" is capable of quantifying the difference in the quality of the can wall surfaces. These data are shown in Table 1.

TABLE 1

| Can Type | Average Reflection (Pixels) |
|---|---|
| Epoxy Can | 132.8 |
| Teflon PFA Can non-optimized | 111.7 |
| Teflon PFA Can optimized | 171.5 |
| Teflon FEP Can | 181.9 |
| Aluminum Foil | 249.6 |

Each can type, Epoxy coated, Teflon-PFA and Teflon-FEP were photographed, the image was digitized, and the digital images were analyzed for their bright area pixels as described in the previous paragraph (Table 2). The same types of cans were then analyzed in the presence of known concentrations of drug. The pressurized cans were chilled, then cut open and the propellant was left to evaporate. Then the same section of the can (base) was analyzed for the average area of brightness. These areas in the presence of drug were invariably less bright when compared to the same areas in the absence of drug.

The least bright were the Teflon-PFA coated cans in the presence of drug which showed a 35% reduction in reflection when compared to the same cans in the absence of drug. The Teflon-FEP coated cans in the presence of drug showed an intermediate brightness and a 33% reduction in brightness when compared to the same cans in the absence of drug. Surprisingly the brightest were the Epoxy cans in the presence of drug and showed the least reduction in brightness (3%). These data are presented in Table 2.

TABLE 2

| Can Type | Average Reflection (Pixels) | Standard (Pixels) | Smoothness Index | % Reduction in Reflection Due to Drug Adhesion |
|---|---|---|---|---|
| Epoxy Can (76588-054) | 132.8 | 249.6 | 0.53 | N/A |
| Epoxy Can (with Drug 1.813 mg/g) | 128.7 | 249.6 | 0.52 | 3% |
| Teflon PFA Can optimized | 171.5 | 249.6 | 0.69 | N/A |
| Teflon PFA Can optimized (with Drug 1.813 mg/g) | 111.7 | 249.6 | 0.43 | 35% |
| Teflon FEP Can | 181.9 | 249.6 | 0.73 | N/A |
| Teflon FEP Can (with Drug 1.813 mg/g) | 121.4 | 249.6 | 0.54 | 33% |
| Aluminum Foil | 249.6 | 249.6 | 1 | N/A |

Aluminum foil was used as a reference standard for a surface that would reflect most. And indeed its reflection (249.6 pixels) was very close to the digital camera's resolution limit of 250 pixels. All consequent measurements were compared to this standard using the "Smoothness Index" equation. Therefore, the closer the ratio to unity the brighter was the studied sample/surface.

The foregoing descriptions of various embodiments of the invention are representative of various aspects of the invention, and are not intended to be exhaustive or limiting to the precise forms disclosed. Many modifications and variations undoubtedly will occur to those having skill in the art. It is intended that the scope of the invention shall be fully defined solely by the appended claims.

We claim:

1. A method for determining a smoothness index of a metered dose container having an inner core, comprising the steps of:
   a) subjecting said inner core of said metered dose container containing at least one pharmacologically active agent, wherein the at least one pharmacologically active agent is a corticosteroid selected from the group consisting of mometasone furoate anhydrous; beclomethasone dipropionate; budesonide; fluticasone; dexamethasone; flunisolide; triamcinolone; (22R)-6α,9α-ditluoro-11β,21-dihydroxy-16α,17α-propylmethylenedioxy-4-pregnen-3,20-dione; and tipredane, to reflected light photomicrography to obtain a digital image containing a plurality of pixels of said inner core;
   b) determining from said digital image the brightness of each of said pixels and quantifying said brightness by assigning an integer value thereto, wherein said value corresponds to an amount of brightness: and
   c) comparing said brightness of said pixel to a reference standard to determine the smoothness index of said inner core of said metered dose container.

2. The method for determining a smoothness index of a metered dose container having an inner core according to claim 1, wherein corticosteroid is mometasone furoate anhydrous.

3. The method for determining a smoothness index of a metered dose container having an inner core according to claim 1, wherein the corticosteroid is beclomethasone diproprionate.

4. The method for determining a smoothness index of a metered dose container having an inner core according to claim 1, wherein the corticosteroid is budesonide.

5. The method for determining a smoothness index of a metered dose container having an inner core according to claim 1, wherein the corticosteroid is fluticasone.

6. A method for determining a smoothness index of a metered dose container having an inner core, comprising the steps of:
   a) subjecting said inner core of said metered dose container containing at least one pharmacologically active agent, wherein the at least one pharmacologically active agent is a β-agonist selected from the group consisting of albuterol, terbutaline, salmeterol, bitolterol, formoterol, eFormoterol, 2(1H)-Quinolinone, 8-hydroxy-5-[1-hydroxy-2-[[2-(4-(methoxmhenyl)-1-methylethyl]amino]ethyl]monohydrochloride, [R—(R*,R*)]-, to reflected light photomicrography to obtain a digital image containing a plurality of pixels of said inner core;
   b) determining from said digital image the brightness of each of said pixels and quantifying said brightness by assigning an integer value thereto, wherein said value corresponds to an amount of brightness: and
   c) comparing said brightness of said pixel to a reference standard to determine the smoothness index of said inner core of said metered dose container.

7. The method for determining a smoothness index of a metered dose container having an inner core according to claim 6, wherein β-agonist is albuterol.

8. The method for determining a smoothness index of a metered dose container having an inner core according to claim 6, wherein the β-agonist is terbutaline.

9. The method for determining a smoothness index of a metered dose container having an inner core according to claim 6, wherein β-agonist is formoterol.

10. The method for determining a smoothness index of a metered dose container having an inner core according to claim 6, wherein the β-agonist is salmeterol.

11. A method for determining a smoothness index of a metered dose container having an inner core comprising the steps of:
    a) subjecting said inner core of said metered dose container containing at least one pharmacologically active agent, wherein the at least one pharmacologically active agent is selected from the group consisting of ipratropium bromide, oxitropium bromide, sodium cromoglycate, nedocromil sodium, montelukast, zafirlukast, pranlukast, bambuterol, fenoterol, clenbuterol, procaterol and broxyterol, to reflected light photomicrography to obtain a digital image containing a plurality of pixels of said inner core;
    b) determining from said digital image the brightness of each of said pixels and quantifying said brightness by assigning an integer value thereto, wherein said value corresponds to an amount of brightness: and
    c) comparing said brightness of said pixel to a reference standard to determine the smoothness index of said inner core of said metered dose container.

12. The method for determining a smoothness index of a metered dose container having an inner core according to claim 11, wherein the at least one pharmacologically active agent is montelukast.

13. A method for determining a smoothness index of a metered dose container having an inner core comprising the steps of:
    a) subjecting said inner core of said metered dose container containing at least one pharmacologically active agent, wherein the at least one pharmacologically active agent is selected from the group combination of a corticosteroid and a β-agonist, to reflected light photomicrography to obtain a digital image containing a plurality of pixels of said inner core;
    b) determining from said digital image the brightness of each of said pixels and quantifying said brightness by assigning an integer value thereto, wherein said value corresponds to an amount of brightness: and
    c) comparing said brightness of said pixel to a reference standard to determine the smoothness index of said inner core of said metered dose container.

14. The method for determining a smoothness index of a metered dose container having an inner core according to claim 13, wherein the corticosteroid is mometasone furoate anhydrous and the β-agonist is formoterol.

15. The method for determining a smoothness index of a metered dose container according to claim 13, wherein the corticosteroid is budesonide and the β-agonist is terbutaline.

16. The method for determining a smoothness index of a metered dose is container having an inner core according to claim 13, wherein the corticosteroid is fluticasone and the β-agonist is salmeterol.

* * * * *